United States Patent [19]
Golfi

[11] Patent Number: 6,073,543
[45] Date of Patent: Jun. 13, 2000

[54] FOOD ROASTING APPARATUS

[76] Inventor: Michele Golfi, 327 East 17th Street, Hamilton, Ontario, Canada, L9A 4M9

[21] Appl. No.: 09/289,731

[22] Filed: Apr. 12, 1999

[51] Int. Cl.$^7$ ...................................................... A47J 37/04
[52] U.S. Cl. ........................... 99/397; 99/427; 99/443 R; 126/41 B
[58] Field of Search ............................... 99/348, 395, 397, 99/409, 427, 443 R; 126/41 R, 41 A, 41 B, 39 L

[56] References Cited

U.S. PATENT DOCUMENTS

| | | | |
|---|---|---|---|
| 2,543,297 | 2/1951 | Olmsted | 99/427 |
| 2,939,383 | 6/1960 | Kanaga | 99/427 X |
| 4,048,473 | 9/1977 | Burkhart | 99/427 X |
| 4,450,758 | 5/1984 | Belinkoff et al. | 99/427 X |

*Primary Examiner*—Reginald L. Alexander
*Attorney, Agent, or Firm*—Patrick J. Hofbauer

[57] ABSTRACT

A food roasting apparatus is disclosed, comprising a pot having: a base wall and a cylindrical sidewall contiguous therewith, the base wall and sidewall defining a pot surface, the sidewall surrounding a central pot axis and extending upwardly from the base wall to terminate in a rim encircling an upper pot opening; two gas burners; a cradle for supporting the pot above the burners in selectively removable relation, with the base wall positioned downwardly from the pot opening and the pot axis angled with respect to horizontal, for rotation of the pot about the pot axis; and a motor for effecting the rotation of the pot. The cradle comprises a base having front, rear and side edges; a rear support rigidly extending upwardly from and transverse to the base, adjacent the rear edge; an arcuate front support sleeve rigidly attached to and extending frontwardly from the rear support in overlying relation to the base and substantially concentric to and beneath the sidewall, when the pot is operatively positioned; a roller mounted to the rear support for rotation about a horizontal roller axis which underlies the pot axis when the pot is operatively positioned. The motor is operatively connected to the roller to effect rotation of same. The roller has an annular surface centered about the roller axis and adapted to support a lower end of the pot, and, upon rotation of the roller, is further adapted to frictionally contact the sidewall, thereby to effect rotation of the pot.

28 Claims, 3 Drawing Sheets

FOOD ROASTING APPARATUS

FIELD OF THE INVENTION

The present invention relates generally to food cooking devices, and is more particularly directed to a food roasting apparatus.

BACKGROUND OF THE INVENTION

Devices which cook foodstuffs by exposing same, on a periodic basis, to relatively higher and lower temperatures, such as rotisserie devices, are well known in the prior art. Such known prior art devices comprise two general types, the first being devices in which foodstuffs are skewered on a rotating spit and the second being devices in which foodstuffs are contained in a rotating cage. Such devices are known to provide a heated cooking environment satisfactory for the production of relatively pleasingly-cooked foodstuffs. However, known devices do not enable an operator to conveniently regulate the amount of moisture or natural greases which are allowed to dissipate from the foodstuffs during cooking. Additionally, known prior art cooking devices suffer in that operators of same are unable to conveniently remove the foodstuffs for inspection from the heated cooking environment during cooking.

SUMMARY OF THE INVENTION

It is an object of the present invention to overcome, inter alia, the shortcomings of the prior art described above by providing a food cooking apparatus that exposes foodstuffs to intermittent periods of relatively higher and lower heat, which allows for convenient removal and inspection of all, or part, of the foodstuffs during cooking without the need to disassemble the components of the apparatus, which provides for convenient regulation of the amount of moisture or natural greases which are allowed to dissipate from the foodstuffs during cooking, and which produces relatively pleasingly-cooked foodstuffs.

These and other objects are addressed by the present invention, a food roasting apparatus.

According to one aspect of the invention, the apparatus comprises a pot member having a base wall portion and a substantially cylindrical sidewall portion contiguous with the base wall portion. The base wall portion and sidewall portion together define an outer pot surface. The sidewall portion surrounds a centrally disposed longitudinal pot axis and extends upwardly from the base wall portion to terminate in a rim portion adjacent an upper end of the pot member, which rim portion encircles, in adjacent relation, an opening of the pot member. There is also provided a heat source means for applying heat to the outer pot surface. A cradle means for supporting the pot member is also provided. The cradle means supports the pot member above the heat source means in selectively removable relation within the cradle means, with the base wall portion positioned generally downwardly with respect to the opening of the pot member and with the pot axis at an acute angle with respect to horizontal. Additionally, the cradle means supports the pot member for controlled rotation of the pot member about the pot axis with respect to the cradle means. A drive means operatively mounted on the cradle means, for effecting said controlled rotation of the pot member about the pot axis as aforesaid, is also provided in the present invention.

According to another aspect of the invention, the cradle means preferably has a substantially horizontal planar cradle base member having front, rear and laterally opposed side edges. There is also provided a rear support member rigidly attached to the cradle base member, adjacent the rear edge thereof. The rear support member extends upwardly from and substantially transverse to the cradle base member. The cradle means further comprises a substantially arcuate front support sleeve of larger diameter than the pot member. The front support sleeve is rigidly attached to the rear support member and extends frontwardly therefrom in overlying relation to the cradle base member and substantially concentric to and beneath the sidewall surface of the pot member, when the pot member is operatively positioned within the cradle means. The cradle means further comprises a roller means mounted to the rear support member for rotation relative to the cradle base member about a substantially horizontal roller axis. The roller axis substantially underlies the pot member when the pot member is operatively positioned within the cradle means. The roller means has a substantially annular outer roller surface centered about the roller axis, and is adapted to operatively support a lower end of the pot member in said selectively-removable relation when the pot member is operatively positioned within the cradle means.

According to another aspect of the invention, the roller surface and the sidewall portion of the pot member are adapted, such that, upon said rotation of the roller means, the roller surface frictionally contacts the sidewall portion of the pot member to effect concurrent rotation of the pot member about the pot axis, and, upon said rotation of the pot member, the sidewall portion thereof frictionally contacts the roller surface to effect concurrent rotation of the roller means about the roller axis, when the pot member is operatively positioned within the cradle means.

According to another aspect of the invention, the drive means is operatively connected to the roller means, to effect controlled driving rotation of the roller means about the roller axis, and thereby to effect controlled driven rotation of the pot member about the pot axis, when the pot member is operatively positioned within the cradle means.

According to another aspect of the invention, the drive means for effecting said controlled driven rotation of the pot member about the pot axis comprises an electric motor operatively connected to a source of electricity.

According to another aspect of the invention, the roller means has a circumferentially-continuous waist groove thereon, defined by a first frustoconical surface and an opposed second frustoconical surface.

According to another aspect of the invention, the first frustoconical surface is angled, with respect to the roller axis, substantially congruent to the inclination of the pot axis with respect to the horizontal, so as to cause said first frustoconical surface to define a driving surface.

According to another aspect of the invention, the second frustoconical surface is in obtuse angular relation to the first frustoconical surface, so as to define a limiting collar which limits downward, longitudinal movement of the pot member in relation to the cradle means.

According to another aspect of the invention, the cradle means further comprises two flanking members mounted on the front support sleeve. Each flanking member has a respective upwardly-presenting support surface. The support surfaces are adapted to support the pot member adjacent the rim portion thereof in said selectively-removable relation when the pot member is operatively positioned within the cradle.

According to another aspect of the invention, the flanking members each comprise an idler roller, positioned upwardly and frontwardly with relation to the driving surface, respectively on lateral sides thereof. The idler rollers are each mounted on the front support sleeve for rotation about a respective idler axis parallel to the pot axis when the pot member is operatively positioned within the cradle means.

According to yet another aspect of the invention, the support surfaces each cylindrically surround a respective one of the idler axes, and are adapted, upon said rotation of the pot member, for concurrent rolling contact with the sidewall portion of the pot member.

Other advantages, features and characteristics of the present invention, as well as methods of operation and functions of the related elements of the structure, and the combination of parts and economies of manufacture, will become more apparent upon consideration of the following detailed description and the appended claims with reference to the accompanying drawings, the latter of which is briefly described hereinbelow.

DETAILED DESCRIPTION OF A PREFERRED EMBODIMENT

Figure 1:
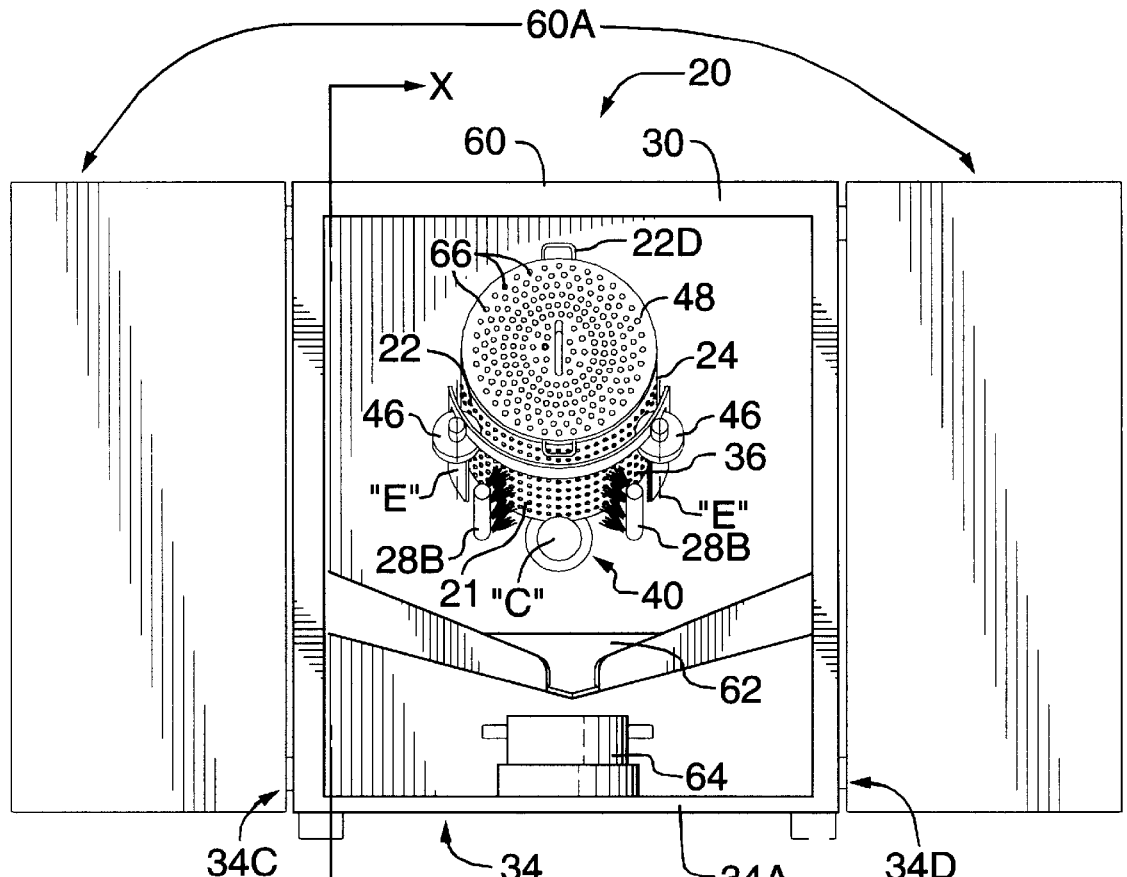
FIG. 1 is a front elevational view of a food roasting apparatus according to a preferred embodiment of the present invention, having the door means thereof illustrated in an open configuration.
Figure 2:
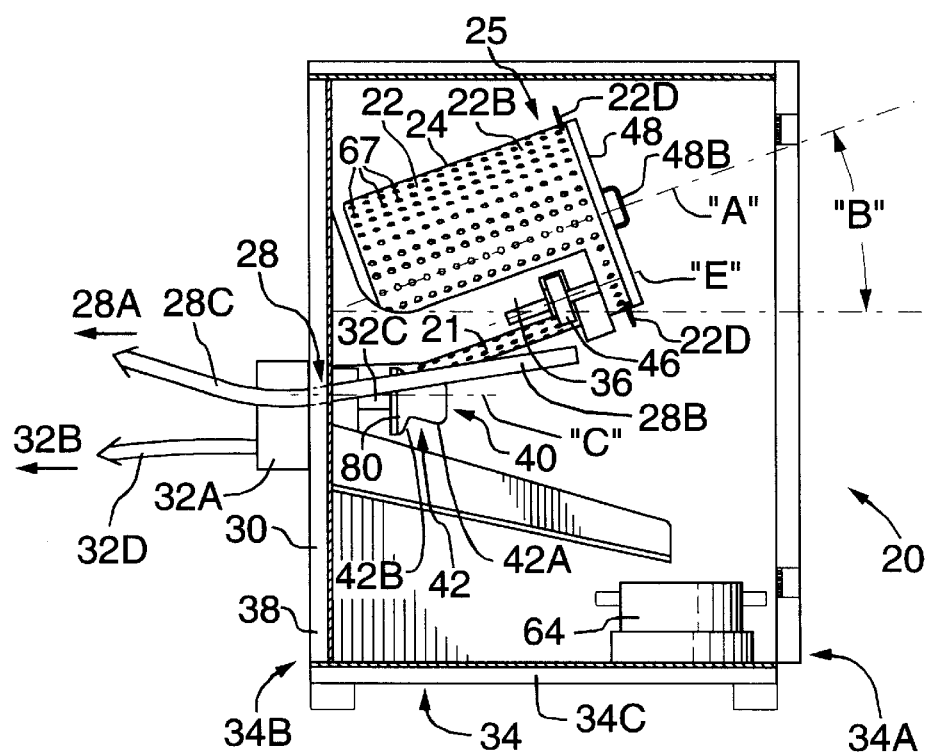
FIG. 2 is a side sectional view of the apparatus of FIG. 1 along sight line X—X of FIG. 1.
Figure 3:
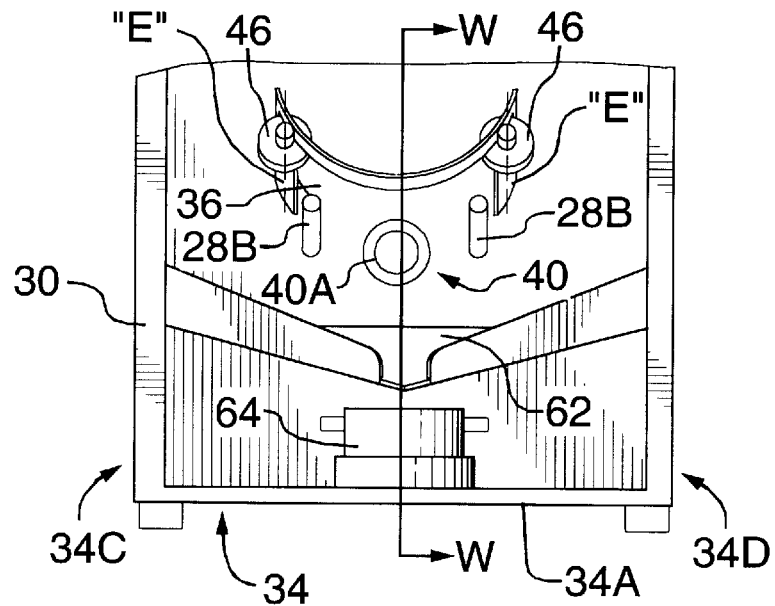
FIG. 3 is a front elevational view of the cradle means and heat source means of FIG. 1, with the pot member removed for clarity of illustration.

Referring generally to FIGS. 1 and 2 of the drawings, a preferred embodiment of a food roasting apparatus according to the present invention is indicated by general reference numeral 20. The apparatus 20 includes a pot member 22, having an outer pot surface 24 and a longitudinal pot axis "A", a heat source means, designated by general reference numeral 28, for applying heat to the outer pot surface 24, a cradle means 30 supporting the pot member 22 above the heat source means 28, and a drive means, designated by general reference numeral 32 for effecting controlled rotation of the pot member 22 about the pot axis "A", when the pot member is operatively positioned within the cradle means 30, all of which being more particularly described below.

Figure 5:
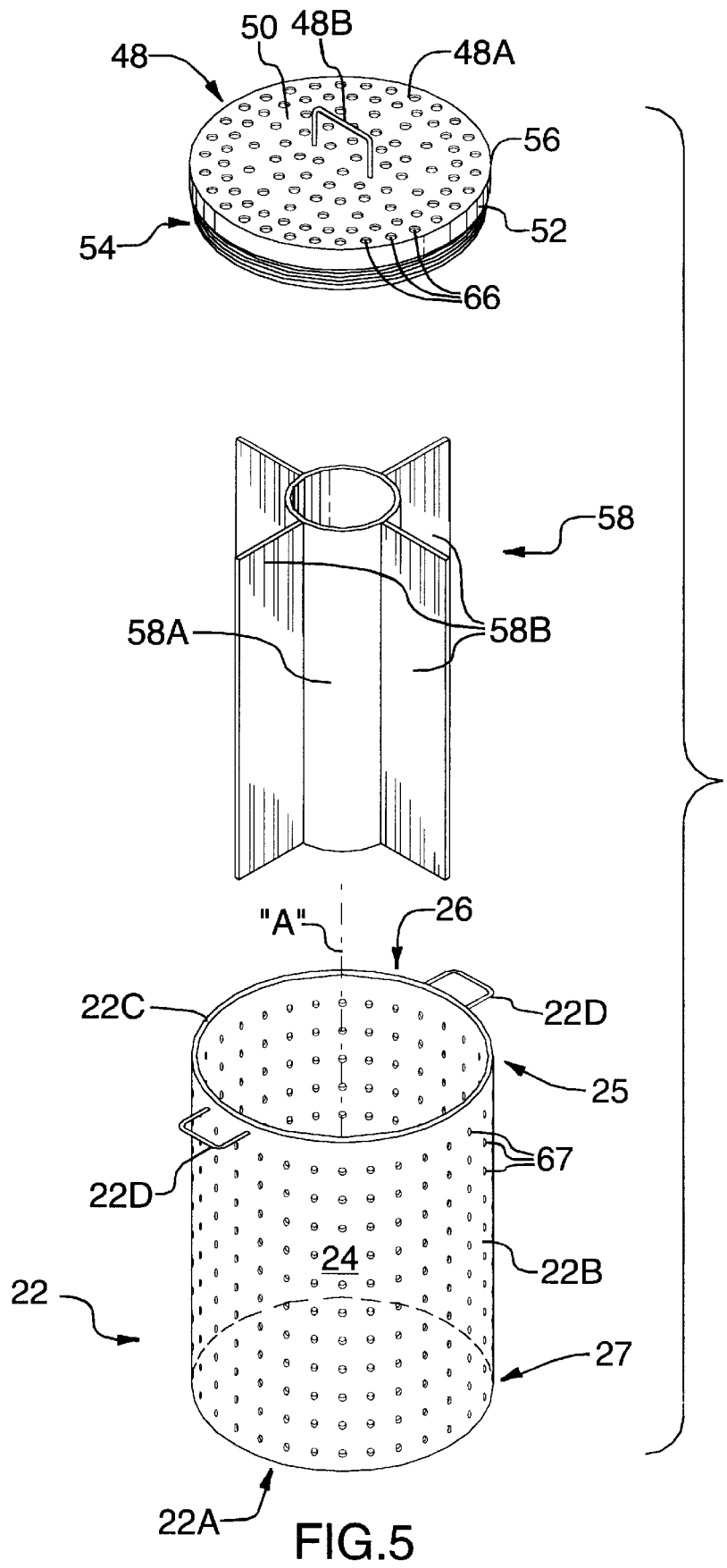
FIG. 5 is an enlarged exploded top perspective view of the pot member, lid member and food separator as seen in FIG. 1, removed from the remainder of the apparatus.

Referring now to FIG. 5 in greater detail, it can be seen that the pot member 22 is of conventional construction, having a substantially circular base wall portion 22A and a substantially cylindrical sidewall portion 22B contiguous with said base wall portion 22A, which together define the aforementioned outer pot surface 24. It is also evident that the pot axis "A" is centrally disposed within the sidewall portion 22B of the pot member 22, and that the sidewall portion 22B extends upwardly from the base wall portion 22A to terminate in a rim portion 22C adjacent an upper end 25 of the pot member 22. An opening 26 of the pot member 22 is encircled and defined by the rim portion 22C.

Figure 4:
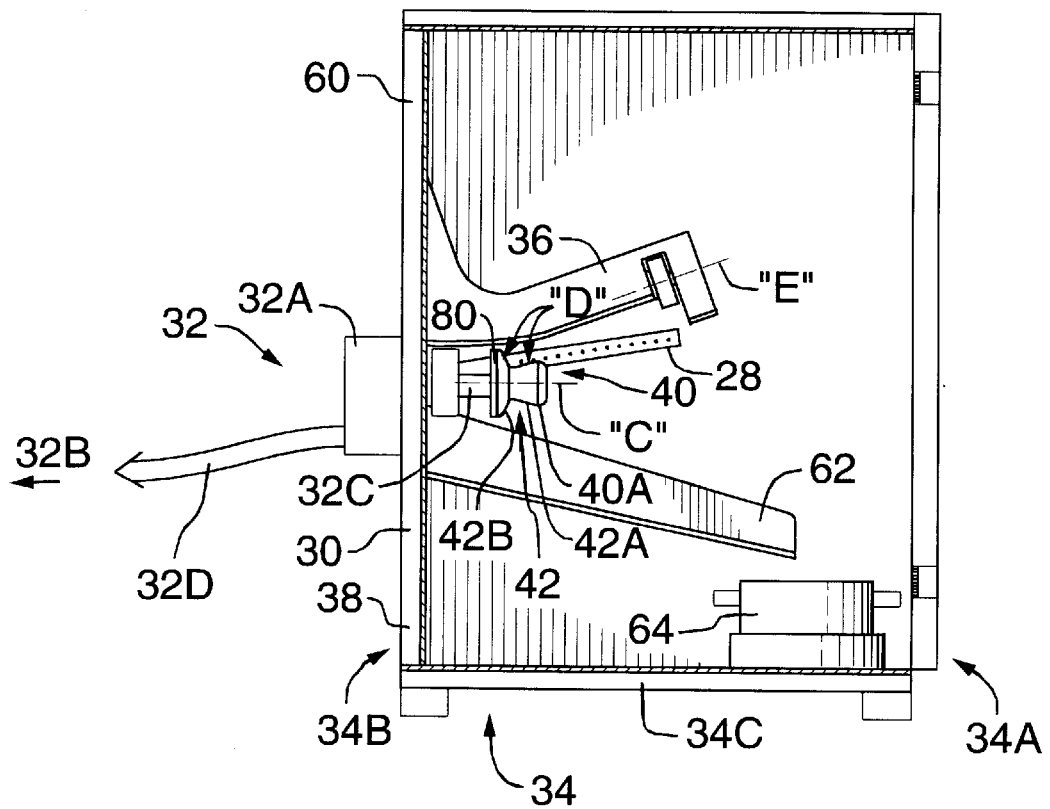
FIG. 4 is a side sectional view of the cradle means and heat source means of FIG. 3 along sight line W—W of FIG. 3.

As seen most clearly in FIGS. 2 and 4, the heat source means 28 which supplies heat to the outer pot surface 24 comprises two propane gas burners 28B, operatively connected by a gas supply line 28C to a source of pressurized propane gas 28A (not shown), said gas burners 28B being positioned beneath the pot member 22 when the pot member 22 is operatively positioned, details of such source 28A and such means of connection being obvious to those skilled in the art.

As best illustrated in FIG. 2, the cradle means 30 supports the pot member 22 in its operative position with the base wall portion 22A of the pot member 22 positioned generally downwardly with respect to the opening 26 of the pot member 22, and with the pot axis "A" at an acute angle "B" with respect to horizontal, said angle "B" preferably being approximately 30°. The cradle means 30 is seen to comprise a substantially horizontal planar cradle base member, designated by general reference numeral 34, having front 34A, rear 34B and laterally opposed side edges 34C and 34D thereof, and a rear support member 38 operatively rigidly attached by welding, bolts or other conventional attachment means (not shown) to the cradle base member 34 adjacent the rear edge 34B thereof. The rear support member 38 extends upwardly from and substantially transverse to the cradle base member 34. The cradle means 30 further comprises a substantially arcuate front support sleeve 36, of larger diameter than the pot member 22. The front support sleeve 36 is rigidly attached to the rear support member 38, by welding, bolts or other conventional attachment means (not shown). The front sleeve 36 extends frontwardly from the rear support member 38 in overlying relation to the cradle base member 34 and substantially concentric to and beneath the sidewall portion of the pot member 22, when the pot member 22 is operatively positioned within the cradle means 30, as best seen in FIG. 1. The cradle means 30 further comprises a roller means, designated by general reference numeral 40, mounted to the rear support member 38 for rotation relative to the cradle base member 34 about a substantially horizontal roller axis "C", which roller axis "C" substantially underlies the pot axis "A" when the pot member 22 is operatively positioned within the cradle means 30, as shown. The roller means 40 has a substantially annular outer roller surface 40A centered about the roller axis "C", shown in FIG. 4, which supports a lower end 27 of the pot member 22. It is evident that the pot member 22 is held against the roller means 40 only by effect of gravity. Accordingly, the pot member 22 may be readily removed from within the cradle means 30 without the use of hand tools, and without the need to disassemble components of the apparatus 20. For the purpose of this specification and the claims appended hereto, this feature of removability without the use of hand tools or disassembly of components of the apparatus shall be termed "selective removability".

The roller means 40 of the cradle means 30 will now be more particularly described, and will be seen in FIG. 2 to be characterized by a circumferentially continuous waist groove 42 thereof, defined by a first frustoconical surface 42A and an opposed second frustoconical surface 42B, which form part of the roller surface 40A. The first frustoconical surface 42A is angled with respect to the roller axis "C" substantially congruent to angle "B", which, as aforedescribed, denotes the angle between the pot axis "C" and horizontal. The second frustoconical surface 42B is in obtuse angular relation to the first frustoconical surface 42A, which angular relation is denoted as angle "D" in the Figures, and preferably approximates angular displacement of about 95°. It will be evident that, when the pot member 22 is operatively positioned within the cradle means 30, as shown in the Figures, the second frustoconical surface 42B defines a limiting collar 80, which limits downward, longitudinal movement of the pot member 22 in relation to the cradle means 30.

Further, when the pot member 22 is operatively positioned within the cradle means 30, the sidewall portion 22B of the pot member 22 frictionally bears against the first frustoconical surface 42A. Accordingly, upon rotation of the roller means 40, the first frustoconical surface 42A defines a driving surface 42A which frictionally engages the sidewall portion 22B of the pot member 22, to effect concurrent rotation of the pot member 22 about the pot axis "A". In the preferred embodiment shown, the drive means 32 is operatively connected in any conventional manner to the roller means 40 to effect controlled driving rotation of the roller means 40 about the roller axis "C", and thereby to effect controlled driven rotation of the pot member 22 about the pot axis "A", when the pot member 22 is operatively positioned within the cradle means 30.

The aforementioned drive means 32, best seen in FIG. 2, preferably comprises a source of electricity 32B, such as a conventional electrical socket (not shown) operatively connected by conventional electrical wiring 32D to a variable-speed electric motor 32A for providing controlled rotation of a drive shaft 32C of the electric motor 32A. Details of such source 32B, wiring 32D, motor 32A and connection are known in the art. The electric motor 32A is conventionally mounted on the cradle means 30 by bolts or other fastening means, (not shown). The drive shaft 32C extends frontwardly from the electric motor 32A coaxial with the drive axis "C", and is operatively connected to the roller means 40, by a key and keyway arrangement, or any other conventional connection means (not shown). It will be appreciated that upon rotation of the drive shaft 32C, the driving surface 40A will rotate therewith, thereby to effect said rotation of the pot member 22, controlled by the electric motor 32A. However, it will also be appreciated that other means of effecting rotation of the pot member 22 about the pot axis "A" may be utilized in the present invention, other than that particularly described herein, and upon said rotation of the pot member 22, the sidewall portion 22B of the pot member 22 frictionally engages the first frustoconical surface 42A, to effect concurrent rotation of the roller means 40 about the roller axis 40A, thereby to limit frictional drag that would otherwise result.

The cradle means 30 preferably comprises two flanking members 46, being two idler rollers 46, each conventionally mounted on the front support sleeve 36 for rotation about respective idler axes "E" parallel to the pot axis "C" when the pot member 22 is operatively positioned. The idler rollers 46 each have a respective upwardly-presenting support surface 46A cylindrically surrounding a respective one of the idler axes "E", and are positioned upwardly and frontwardly from the driving surface 40A, respectively on lateral sides thereof, to support the pot member 22 adjacent its rim portion 22C. It is evident that the flanking members 46 support the pot member 22 in selectively-removable relation, as previously defined. It will similarly be appreciated that, in operation, upon driving rotation of the drive roller 40, the sidewall portion 22B of the pot member 22 rollingly contacts the flanking members 46, which in turn, concurrently rotate about their respective axes "E", thereby to limit frictional drag that would otherwise result.

A lid member 48, for regulation of the escape of moisture and vaporized oils and greases from the pot member 22 during operation, is also preferably provided, and is shown most clearly in FIG. 5. The lid member 48 has a substantially circular cover portion 48A, with an upper surface 50 and a lower surface 52 thereof. An inwardly-stepped flange portion 54 preferentially extends circumferentially around the lower surface 52, adjacent an outer perimeter 56 thereof, for selectively removable insertion into the opening 26 of the pot member 22 in frictionally close-contacting relation with the rim portion 22C of the pot member 22. As well, a lid handle 48B is rigidly attached to the upper surface 50 of the lid member 48 to facilitate removal of same from the pot member 22.

Preferentially, both the cover portion 48A of the lid member 48, and the outer pot surface 24 have, respectively, a plurality of openings 66, 67 therein, to regulate the escape of moisture and natural oils and greases during roasting. The placement and number of the openings 66, 67 is highly variable, depending upon the foodstuffs to be roasted in this apparatus.

As well, a food separator 58, comprising a cylindrical main body portion 58A and four fin portions 58B equally spaced about and extending radially outwardly from the main body portion 58A, is preferably present, and adapted for selectively-removable insertion in the opening 26 of the pot member 22. The insertion of such a food separator 58 is advantageous, as it enables delicate foods (not shown), which items would otherwise be bruised or compressed during operation, to be roasted in the apparatus 20.

In the preferred embodiment shown, there is also included a housing member 60 (best seen in FIGS. 1 and 2) which surrounds and insulates the pot member 22, cradle means 30 and heat source means 28, to lessen heat loss which would otherwise result from its absence, and consequentially lessening operating costs. For access to the pot member 22, the housing 60 has a door means 60A, which in the preferred embodiment shown comprises two hinged doors, positioned and dimensioned to enable easy removal of the pot member 22 from within the cradle means 30. To further facilitate removal of the pot member 22, two pot handles 22D are rigidly attached, by rivets or other conventional fastening means (not shown), to the pot member 22, adjacent its upper end 25. The pot member 22 and cradle means 30 are preferably constructed of heat-resistant material, such as metal.

Finally, there is additionally provided in the preferred embodiment of the present invention a drip pan member 62, conventionally rigidly attached to the housing member 60, which spans beneath the pot member 22 for the collection of grease, oils and other fluids which drain through the openings 67 in the pot member 22. The drip pan member 62 is shaped and dimensioned such that, in operation, the drip pan member 62 channels such fluids, grease and oils toward a provided receptacle 64, for convenient disposal. The drip pan member 62 and the receptacle 64 are preferably selectively-removable from the housing member 60, to facilitate cleaning of same.

It will be appreciated that, while but a single specific embodiment of the present invention is shown, various changes in size, shape and arrangement of parts may be made without departing from the spirit or scope of the invention. More particularly, cooking pots and inserts, having various configurations, may be used with a wide variety of foodstuffs. Indeed, a pot having no openings 67 could be utilized.

I claim:

1. An apparatus for roasting food items comprising, in combination:

a pot member having a base wall portion and a substantially cylindrical sidewall portion contiguous with said base wall portion, said base wall portion and said sidewall portions together defining an outer pot surface, said sidewall portion surrounding a centrally disposed longitudinal pot axis and extending upwardly from the base wall portion to terminate in a rim portion adjacent an upper end of the pot member, which rim portion encircles, in adjacent relation, an opening of the pot member;

a heat source means for applying heat to the outer pot surface to effect said roasting;

a cradle means for supporting the pot member above the heat source means in selectively removable relation within the cradle means, with the base wall portion positioned generally downwardly with respect to the open end of the pot member and the pot axis at an acute angle with respect to horizontal, for controlled rotation of the pot member about the pot axis with respect to the cradle means; and a drive means operatively mounted on the cradle means for effecting said controlled rotation of the pot member about the pot axis as aforesaid.

2. An apparatus for roasting food items according to claim 1, wherein the cradle means comprises:

a substantially horizontal planar cradle base member having front, rear and laterally opposed side edges;

a rear support member rigidly attached to the cradle base member adjacent the rear edge thereof and extending upwardly therefrom substantially transverse to said cradle base member;

a substantially arcuate front support sleeve, of larger diameter than said pot member, rigidly attached to the rear support member and extending frontwardly therefrom in overlying relation to said cradle base member and substantially concentric to and beneath the sidewall portion of the pot member, when the pot member is operatively positioned within the cradle means;

a roller means mounted to the rear support member for rotation relative to the cradle base member about a substantially horizontal roller axis, which roller axis substantially underlies the pot axis when the pot member is operatively positioned within the cradle means, said roller means having a substantially annular outer roller surface centered about said roller axis, which roller surface is adapted to operatively support a lower end of the pot member in said selectively-removable relation when the pot member is operatively positioned within the cradle means.

3. An apparatus for roasting food items according to claim 2, wherein the roller surface and the sidewall portion of the pot member are adapted, such that, upon said rotation of the roller means, the roller surface frictionally contacts the sidewall portion of the pot member to effect concurrent rotation of the pot member about the pot axis, and, upon said rotation of the pot member, the sidewall portion thereof frictionally contacts the roller surface to effect concurrent rotation of the roller means about the roller axis, when the pot member is operatively positioned within the cradle means.

4. An apparatus for roasting food items according to claim 3, wherein the drive means is operatively connected to the roller means, to effect controlled driving rotation of the roller means about the roller axis, and thereby to effect controlled driven rotation of the pot member about the pot axis, when the pot member is operatively positioned within the cradle means.

5. An apparatus for roasting food items according to claim 4, wherein said drive means for effecting said controller driven rotation of the pot member about the pot axis comprises an electric motor operatively connected to a source of electricity.

6. An apparatus for roasting food items according to claim 3, wherein the roller means has a circumferentially-continuous waist groove thereon, defined by a first frustoconical surface and an opposed second frustoconical surface.

7. An apparatus for roasting food items according to claim 6, wherein the first frustoconical surface is inclined, with respect to the roller axis, substantially congruent to the inclination of the pot axis with respect to the horizontal, so as to cause said first frustoconical surface to define a driving surface.

8. An apparatus for roasting food items according to claim 7, wherein the second frustoconical surface is in obtuse angular relation to the first frustoconical surface, so as to define a limiting collar which limits downward, longitudinal movement of the pot member in relation to the cradle means.

9. An apparatus for roasting food items according to claim 8, wherein said obtuse angular relation comprises an angular displacement of approximately 95°.

10. An apparatus for roasting food items according to claim 9, wherein the cradle means supports the pot member with the pot axis angled approximately 30° with respect to horizontal.

11. An apparatus for roasting food items according to claim 3, wherein the cradle means further comprises two flanking members mounted on the front support sleeve, each flanking member having a respective upwardly-presenting support surface, which support surfaces are adapted to support the pot member adjacent the rim portion thereof in said selectively-removable relation when the pot member is operatively positioned within the cradle means.

12. An apparatus for roasting food items according to claim 11, wherein the flanking members each comprise an idler roller, positioned upwardly and frontwardly with relation to the driving surface, respectively on lateral sides thereof, which idler rollers are each mounted on the front support sleeve for rotation about a respective idler axis parallel to the pot axis when the pot member is operatively positioned within the cradle means.

13. An apparatus for roasting food items according to claim 12, wherein the support surfaces each cylindrically surround a respective one of the idler axes, and are adapted, upon said rotation of the pot member, for concurrent rolling contact with the sidewall portion of the pot member.

14. An apparatus for roasting food items according to claim 1, wherein the heat source means comprises a source of gas operatively connected to two gas burners, which gas burners are positioned beneath the pot member when the pot member is operatively positioned within the cradle means.

15. An apparatus for roasting food items according to claim 14, wherein the source of gas is a source of pressurized propane gas, and the gas burners are burners for pressurized propane gas.

16. An apparatus for roasting food items according to claim 1, further comprising a lid member for the pot member, said lid member comprising:

a substantially circular cover portion having an upper surface and a lower surface;

an inwardly-stepped flange portion circumferentially extending around the lower surface adjacent an outer perimeter thereof, said flange portion being adapted for removable insertion into the opening of the pot member in frictionally close contacting relation with the rim portion of the pot member; and a lid handle rigidly attached to the upper surface of said cover portion.

17. An apparatus for roasting food items according to claim 16, wherein the cover portion of the lid member has a plurality of openings therein.

18. An apparatus for roasting food items according to claim 1, wherein the outer pot surface has a plurality of openings therein.

19. An apparatus for roasting food items according to claim 1, further comprising a food separator adapted for removable insertion into the opening of the pot member, said food separator comprising:
- a cylindrical main body portion; and
- a plurality of fin portions radially extending outwardly from said main body portion.

20. An apparatus for roasting food items according to claim 19, wherein the food separator has four fin portions equally spaced about the main body portion.

21. An apparatus for roasting food items according to claim 1, further comprising a housing member rigidly attached to the cradle means and adapted to surround the cradle means, pot member and heat source in insulating relation when the pot member is operatively positioned within the cradle means, said housing member including a door means thereof positioned and dimensioned to provide access to said pot member for selective removal of same from within said cradle means.

22. An apparatus for roasting food items according to claim 1, further comprising one or more pot handles rigidly attached to the pot member adjacent its upper end.

23. An apparatus for roasting food items according to claim 1, further comprising a drip pan member adapted for rigid, selectively removable attachment to the cradle means beneath the pot member when said pot member is operatively positioned within the cradle means, thereby to collect fluids which may be released from within the pot member during said roasting of food items.

24. An apparatus for roasting food items according to claim 23, further comprising a selectively-removable receptacle positioned beneath the drip pan member, and wherein the drip pan member is shaped and dimensioned to direct said fluids collected by the drip pan member into said receptacle.

25. An apparatus for roasting food items for use with a pot member having a base wall portion and a substantially cylindrical sidewall portion contiguous with said base wall portion, said base wall portion and said sidewall portions together defining an outer pot surface, said sidewall portion surrounding a centrally disposed longitudinal pot axis and extending upwardly from the base wall portion to terminate in a rim portion adjacent an upper end of the pot member, which rim portion encircles, in adjacent relation, an opening of the pot member, comprising:
- a heat source means for applying heat to said outer pot surface to effect said roasting;
- a cradle means for supporting said pot member above the heat source means in selectively removable relation within the cradle means, with the base wall portion positioned generally downwardly with respect to the opening of said pot member and said pot axis at an acute angle with respect to horizontal, for controlled rotation of said pot member about the pot axis with respect to the cradle means; and
- a drive means operatively mounted on the cradle means for effecting said controlled rotation of the pot member about the pot axis as aforesaid.

26. An apparatus for roasting food items according to claim 25, wherein the cradle means comprises:
- a substantially horizontal planar cradle base member having front, rear and laterally opposed side edges;
- a rear support member rigidly attached to the cradle base member adjacent the rear edge thereof and extending upwardly therefrom substantially transverse to said cradle base member;
- a substantially arcuate front support sleeve, of larger diameter than said pot member, rigidly attached to the rear support member and extending frontwardly therefrom in overlying relation to said cradle base member and substantially concentric to and beneath said sidewall portion of said pot member, when said pot member is operatively positioned within the cradle means;
- a roller means mounted to the rear support member for rotation relative to the cradle base member about a substantially horizontal roller axis, which roller axis substantially underlies said pot axis when said pot member is operatively positioned within the cradle means, said roller means having a substantially annular outer roller surface centered about said roller axis, which roller surface is adapted to operatively support a lower end of said pot member in said selectively-removable relation when said pot member is operatively positioned within the cradle means.

27. An apparatus for roasting food items according to claim 26, wherein the roller surface is adapted, such that, upon said rotation of the roller means, the roller surface frictionally contacts said sidewall portion of said pot member to effect concurrent rotation of said pot member about said pot axis, and, upon said rotation of said pot member, said sidewall portion thereof frictionally contacts the roller surface to effect concurrent rotation of the roller means about the roller axis, when said pot member is operatively positioned within the cradle means.

28. An apparatus for roasting food items according to claim 27, wherein the drive means is operatively connected to the roller means, to effect controlled driving rotation of the roller means about the roller axis, and thereby to effect controlled driven rotation of said pot member about said pot axis, when said pot member is operatively positioned within the cradle means.

* * * * *